(12) United States Patent
Araki

(10) Patent No.: US 6,219,610 B1
(45) Date of Patent: *Apr. 17, 2001

(54) TURN CONTROL SYSTEM FOR VEHICLE

(75) Inventor: Michiki Araki, Kobe (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,733

(22) Filed: Apr. 5, 1999

(30) Foreign Application Priority Data

Apr. 3, 1998 (JP) .................................. 10-091486

(51) Int. Cl.⁷ ................... B60F 7/00; B60F 8/00; B60F 10/00; B60F 17/00; B60F 19/00
(52) U.S. Cl. ..................... 701/72; 701/78; 701/83; 701/41; 303/140; 303/146; 303/147; 303/148
(58) Field of Search ................ 701/72, 78, 83, 701/41; 303/140, 146, 147, 148

(56) References Cited

U.S. PATENT DOCUMENTS

| | | | |
|---|---|---|---|
| 5,788,342 | 8/1998 | Noguchi | 303/116.2 |
| 5,797,663 | * 8/1998 | Kawaguchi | 303/146 |
| 5,816,669 | * 10/1998 | Hiwatashi et al. | 303/140 |

FOREIGN PATENT DOCUMENTS

| | | |
|---|---|---|
| 5-24528 | 2/1993 | (JP) . |
| 7-329759 | 12/1995 | (JP) . |
| 8-150920 | 6/1996 | (JP) . |
| 8-244587 | 9/1996 | (JP) . |
| 10-29819 | 2/1998 | (JP) . |

OTHER PUBLICATIONS

Masato Abe, "Vehicle Dynamics and Control", (First edition 1992). No month.

* cited by examiner

Primary Examiner—William A Cuchlinski, Jr.
Assistant Examiner—Ronnie Mancho
(74) Attorney, Agent, or Firm—Foley & Lardner

(57) ABSTRACT

A vehicle turn control system has a controller connected to a steer angle detecting section, a vehicle speed sensor and a vehicle turn state detecting section. The controller calculates a target vehicle turn state from a steer angle and a vehicle speed and controls brake pressure supplied to a brake cylinder of each wheel of the vehicle according to a difference between the actual vehicle turn state and the target vehicle turn state. The controller executes a pre-charge control of a brake cylinder of a wheel to be braked next and restricts the pre-charge control according to the vehicle turn condition.

14 Claims, 6 Drawing Sheets

U.S

O.S

U.S

O.S

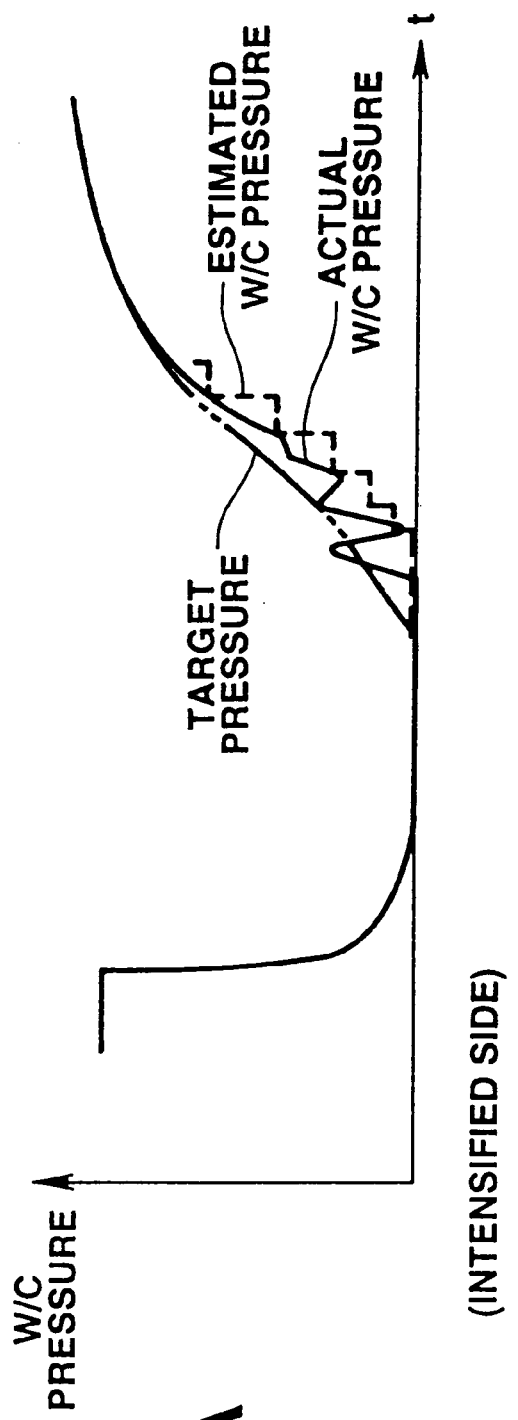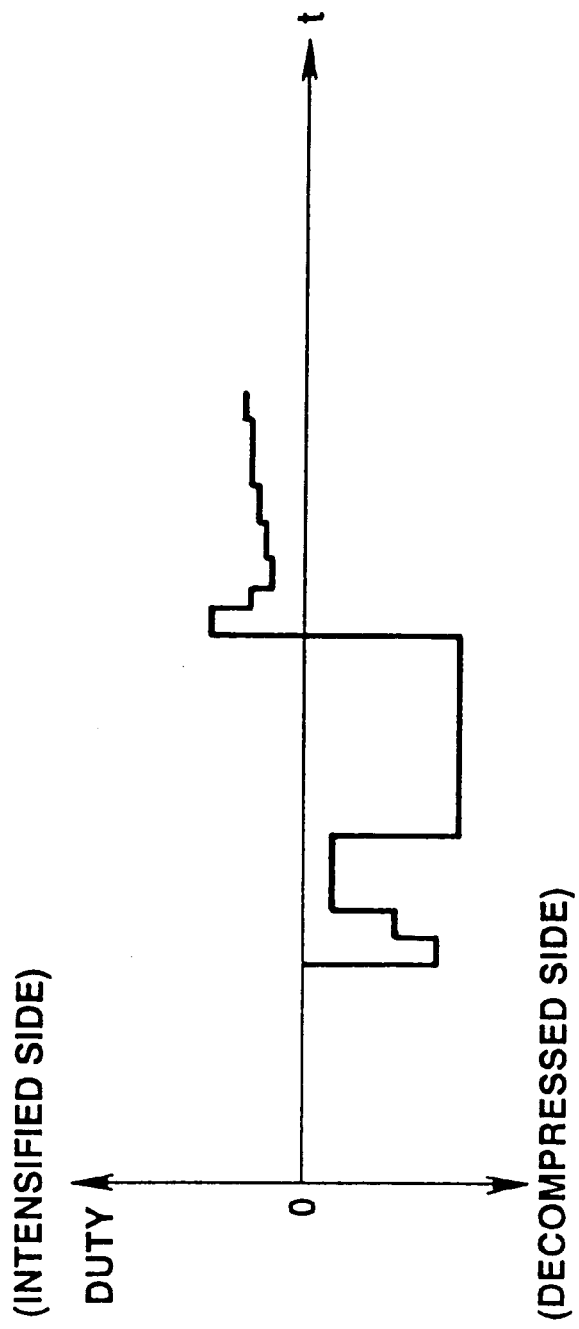
FIG.7A
FIG.7B

TURN CONTROL SYSTEM FOR VEHICLE

BACKGROUND OF THE INVENTION

The present invention relates to a vehicle turn control system which is arranged to generate a turn moment by controlling a brake fluid pressure applied to a brake cylinder of each wheel on the basis of vehicle turn information such as yaw rate and sideslip angle or sideslip speed, and a vehicle turn target value calculated based on a vehicle model.

A variety of vehicle turn control systems have been proposed. A typical vehicle turn control system is arranged to calculate a target value of a vehicle turn variable such as a yaw rate, a sideslip angle or sideslip speed on the basis of a vehicle model and to detect an actual value of the vehicle turn variable generated at the vehicle, and to control a braking force of each wheel so as to adjust the actual vehicle behavior variable to the target value. When the vehicle is put in an excessive oversteer or understeer state that is a turning state out of a tire gripping range, such a conventional vehicle turn control system enables the vehicle turning state to return to the tire gripping range by generating a returning spin moment at the vehicle through the brake control. Further, another vehicle turn control system is arranged to previously apply a pre-charge of pressure to a wheel cylinder to be intensified in order to improve a responsibility as to the generation of braking force of a wheel cylinder to be intensified in pressure from zero pressure.

SUMMARY OF THE INVENTION

In case of this another vehicle turn control system, each wheel cylinder of each wheel is connected to one of two lines of a master cylinder which lines are constituted by a diagonal split brake system or vertical split brake system. A typical fluid pressure circuit of the conventional vehicle turn control system comprises a master cylinder ON/OFF valve for ON/OFF controlling the discharge pressure of a master cylinder and an intensifying pump ON/OFF valve for ON/OFF controlling a discharge pressure of an intensifying pump. An intensifying control valve is disposed between each of two brake cylinders and a brake fluid pressure source constituted by the intensifying pump or the master cylinder and ON/OFF controls the fluid connection therebetween. A reducing control valve is disposed between each brake cylinder and a suction side of a reducing pump.

The discharge side of the reducing pump is connected to the brake fluid pressure source. With this arrangement, in case that a pressure In one of the two brake cylinders of one line is intensified, the intensifying pump is driven, the master cylinder ON/OFF valve is closed, and the intensifying pump ON/OFF valve is opened. Under this setting of the system, the intensifying control valve is opened while keeping the closed state of the reducing control valve. In case that a pressure of one of the brake cylinders is reduced, the reducing pump is driven and the reducing control valve is opened while keeping the closed state of the intensifying control valve. By this operation, the brake fluid is discharged from the brake cylinder to a reservoir. When a depression of the brake pedal is canceled during the anti-skid control wherein the intensifying control valve is closed, the brake fluid in each brake cylinder is quickly returned to the master cylinder through a check valve Installed parallel with the intensifying control valve.

However, in case that the pressures of the two brake cylinders connected to a line having one brake fluid pressure source have large pressure differences therebetween, if the low pressure side brake cylinder is intensified, the brake fluid in the high pressure side brake cylinder flows out through the check valve toward the discharge side of the intensifying pump to lower the brake fluid pressure of the high pressure side brake cylinder. More specifically, in order to suppress the lowering of the responsibility, if a responsibility improving pre-charge control is executed by supplying a small amount of brake fluid which is as small as an amount which does not generate braking force is executed to improve the responsibility of the brake fluid pressure control, the brake fluid flows to the brake cylinder to be pre-charged, due to the large pressure difference between the high pressure side and the low pressure side brake cylinders. As a result, the intensified gradient of the high pressure side pressure is further lowered and therefore it becomes difficult to ensure the necessary brake fluid pressure.

It is an object of the present invention to provide an improved vehicle turn control system which ensures the intensifying gradient of the brake fluid pressure of a high pressure side brake cylinder and a responsibility of a brake pressure control by suppressing the pressure intensifying of the low pressure side brake cylinder when there is a large pressure difference between the brake fluid pressures of the two brake cylinders connected to one pressure source and when it is necessary to further intensify the brake pressure in the high pressure side brake cylinder.

A turn control system according to the present invention is for a vehicle and comprises a steer angle sensor, a vehicle speed detector, a vehicle turn variable detecting section, a brake system and a controller. The steer angle sensor senses a steer angle of a wheel of the vehicle. The vehicle speed detector senses a vehicle speed. The vehicle turn variable detecting section detects a vehicle turn variable indicative of a turning state of the vehicle. The brake system applies brake fluid pressure to a brake cylinder of each wheel of the vehicle. The controller is to calculate a target vehicle turn variable on the basis of the steer angle and the vehicle speed, to control the brake system according to a difference between the actual vehicle turn variable and the target vehicle turn variable, to apply a pre-charge pressure to a brake cylinder to next receive the brake fluid pressure on the basis of the vehicle turn state when the brake system is operating, and to restrict the operation of applying the pre-charge pressure according to the vehicle turn condition.

BRIEF DESCRIPTION OF THE DRAWING

FIGS. 7A and 7B are graphs for explaining the operation of the brake fluid pressure of FIG. 2.

DETAILED DESCRIPTION OF THE INVENTION

Referring to FIGS. 1 to 7, there is shown an embodiment of a vehicle turn control system according to the present invention.

Figure 1:
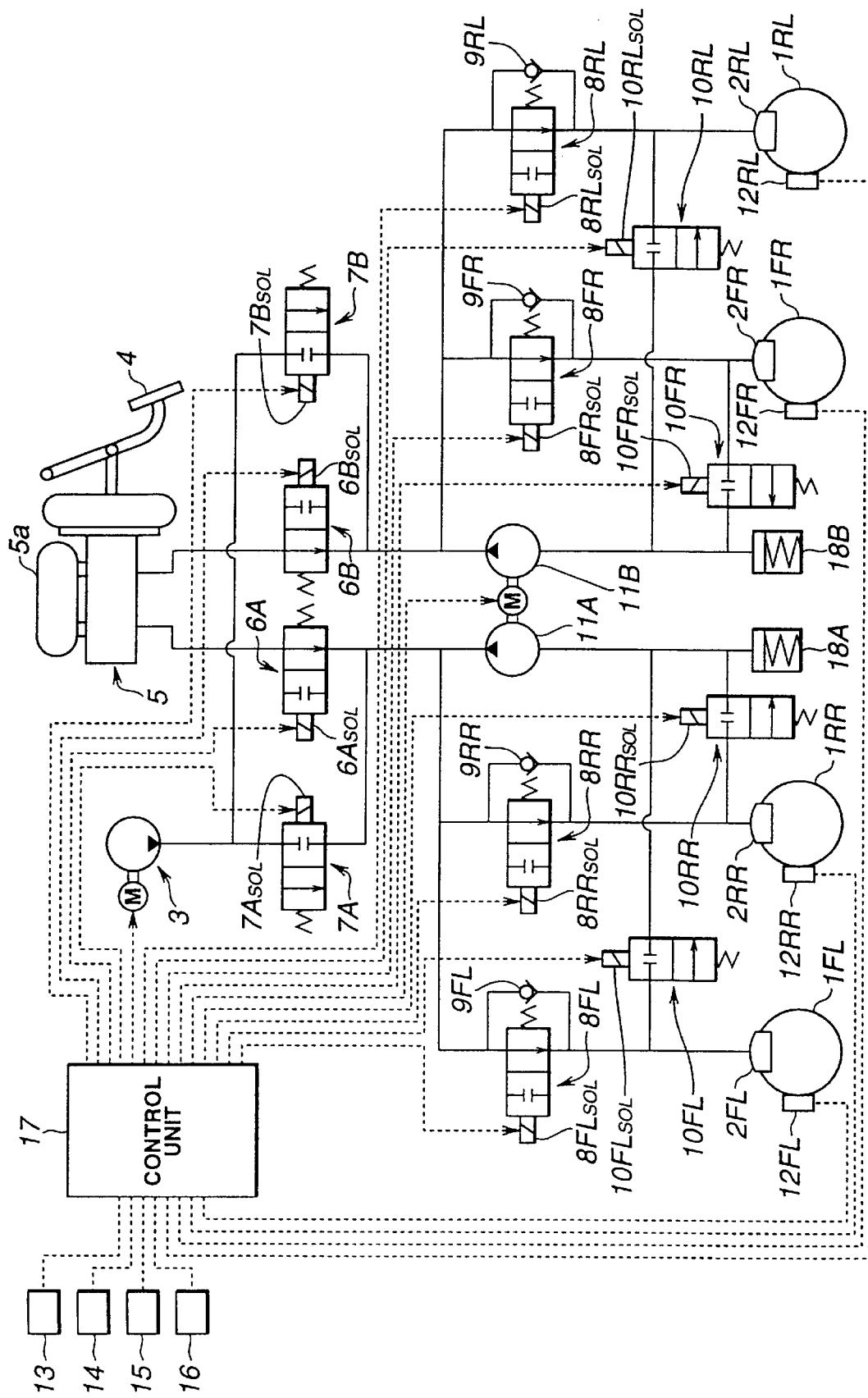
FIG. 1 is a schematic view showing an embodiment of a vehicle turn control system according to the present invention.

FIG. 1 shows a system view of a brake fluid pressure system and a electric system of the brake fluid pressure control system functioning as a vehicle turn control system according to the present invention of the present invention. Wheel cylinders 2FL, 2FR, 2RL, 2RR for braking are installed to left and right front wheels 1FL and 1FR and left and right rear wheels 1RL and 1RR, respectively. Each of the wheel cylinders 2FL, 2FR, 2RL and 2RR serves as a so-called disc brake for executing braking by pressing a pad on a disc rotor.

A master cylinder S produces master cylinder pressure for two lines according to a depressing operation of a brake pedal 4. One line of the master cylinder 5 is connected to the front right wheel cylinder 2FL and the rear right wheel cylinder 2RR. The other line of the master cylinder 5 is connected to the front right wheel cylinder 2FR and the rear left wheel cylinder 2RL. That is, the line structure of the master cylinder 5 is a diagonal split structure. As mentioned above, the first and second master cylinder ON/OFF valves 6A and 6B are installed to the line including the master cylinder 5 and the wheel cylinders 2FL and 2RR and the line including the master cylinder 5 and the wheel cylinders 2FR and 2RL, respectively, An intensifying pump 3 is provided to pressurize brake fluid in a master cylinder reservoir 5a of the master cylinder 5. The intensifying pump 3 has two discharge ports connected to the two lines of the master cylinder 5, respectively. One of the discharge ports of the intensifying pump 3 is connected to a downstream side of the first master cylinder ON/OFF valve 6A through a pressure pump ON/OFF valve 7A. The other discharge port of the intensifying pump 3 is connected to a downstream side of the second master cylinder ON/OFF valve 6B through a pressure pump ON/OFF valve 7B. Each line of the master cylinder 5 or each line from the intensifying pump 3 is distinguished as a line of the brake fluid pressure source. Further, intensifying control valves 8FL and 8RR are installed at upstream sides of the wheel cylinders 2FL and 2RR, respectively. Similarly, intensifying control valves 8FR and 8RL are installed at upstream sides of the wheel cylinders 2FR and 2RL, respectively. Each intensifying control valve 8FL, 8RR, 8FR, 8RL has a bypass passage in which a check valve 9FL, 9RR, 9FR, 9RL is installed. These check valves 9FL, 9RR, 9FR and 9RL function to quickly return the brake fluid to the master cylinder 5 when the brake pedal is released.

A discharge port of each reducing pump 11A, 11B is connected to each of the lines of the brake fluid pressure source. Reducing control valves 10FL and 10RR are installed between a suction port of the reducing pump 11A and the wheel cylinders 2FL and 2RR, respectively. Similarly, reducing control valves 10FR and 10RL are installed between a suction port of the reducing pump 118 and the wheel cylinders 2FR and 2RL, respectively. A motor drives the two reducing pumps 11A and 11B. A reservoir 18A for avoiding interference is installed between the reducing control valves 10FL and 10RR and the reducing pump 11A, and a reservoir 18B for avoiding interference is installed between the reducing control valves 10FR and 10RL and the reducing pump 113B. These control valves 6A, 6B, 7A, 7B, 8FL, 8RR, 8FR, 8RL, 10FL, 10RR, 10FR, and 10RL are a two position selector valve which is switched according to a drive signal outputted from a control unit 17. In order to keep fail safe, the master cylinder ON/OFF valves 6A and 613 are of a normal open type, the intensifying pump ON/OFF valves 7A and 7B are of a normal close type, the intensifying control valves 8FL, 8RR, 8FR and 8RL are of a normal open type, the reducing control valves 10FL, 10RR, 10FR and 10RL are of a normal close type. These control valves 6A, 6B, 7A, 7B, 8FL, 8RR, BFR, 8RL, 10FL, 10RR, 10FR, and 10RL change their state from a close state to an open state or from an open state to a close state when the solenoid valves $6A_{SOL}$, $6B_{SOL}$, $7A_{SOL}$, $7B_{SOL}$, $8FL_{SOL}$, $8RR_{SOL}$, $8FR_{SOL}$, $8RL_{SOL}$, $10FL_{SOL}$, $10RR_{SOL}$, $10FR_{SOL}$, and $10RL_{SOL}$ are excited by the drive signals from the control unit 17, respectively. The operations of the intensifying pump 3 and the reducing pumps 11A and 11B are controlled according to the drive signals from the control unit 17.

In case that the brake fluid pressure (wheel cylinder pressure) of each of the wheel cylinders 2FL to 2RR is intensified to control the baking force for executing the vehicle turn control, the brake fluid pressure circuit executes such that the intensifying pump 3 is driven under a condition that the master cylinder ON/OFF valves 6A and 6B are closed and the intensifying pump ON/OFF valves 7A and 7B are opened, and that each of the intensifying control valves 8FL to 8RR is controllably opened while closing each of the reducing valves 10FL to 10RR to supply the produced pressure by the intensifying pump 3 to each of the wheel cylinders 2FL to 2RR.

In case that each of the wheel cylinder pressures of the wheel cylinders 2FL to 2RR is reduced after the wheel cylinder pressures are intensified, the reducing pumps 11A and 115 are driven under the condition that the master cylinder ON/OFF valves 6A and 6B are closed and the intensifying pump ON/OFF valves 7A and 76 are closed, and simultaneously each of the reducing control valves 10FL to 10RR is opened to discharge the brake fluid from each of the wheel cylinders 2FL to 2RR.

The control for opening the intensifying control valves 8FL to 8RR and the reducing valves 10FL to 10RR will be discussed later. It will be understood that the master cylinder ON/OFF valves 6A and 6B are opened during the depression of the brake pedal so as to reduce the reaction force to the brake pedal 4.

Wheel speed sensors 12FL, 12FR, 12RL and 12RR are installed to the wheels 1FL, 1FR, 1RL and 1RR, respectively, to detect a wheel speed corresponding to the rotation speed of each wheel and to output a sine wave signal corresponding to the wheel speed.

A yaw rate sensor 13 senses an actual yaw rate $\psi'$ generated at the vehicle. A steering angle sensor 14 senses an angle of a steered wheel of the vehicle which, in this example, is obtained from a steering wheel angle of a steering wheel. An acceleration sensor 15 senses a lateral acceleration and a forward acceleration of the vehicle. A master cylinder pressure sensor 15 senses a master cylinder pressure $P_{MC}$ of the two lines. A braked switch (not shown) senses a depressed state of the brake pedal 4 and outputs a brake signal indicative of the brake depressed state. The signals indicative of sensed information are inputted from the sensors 12FL, 12FR, 12RL, 12RR, 13, 14, 15 and 16 to the control unit 17. Both of the actual yaw rate $\psi'$ of the yaw rate sensor 13 and the steered angle $\theta$ of the steering angle sensor 14 have the same directionality. More specifically, when the steering wheel is steered in the rightward direction, the steered angle $\theta$ increases in a plus side, and the yaw rate $\psi'$ generated by this steering operation is denoted by a plus value. Similarly, when the steering wheel is steered in the leftward direction, the steered angle $\theta$ decreases in a minus side, and the yaw rate $\psi$ generated by this steering operation is denoted by a minus value. Further, the brake signal from the brake switch takes a logical value "1" indicative of an ON state of the brake switch when the brake pedal 4 is depressed, and takes a logical value "0" indicative of an OFF state when the brake pedal 4 is not depressed.

The control unit 17 comprises a microcomputer which receives the detection signals from the sensors 12FL, 12FR, 12RL, 12RR, 13, 14, 15 and 16 and outputs control signals. Further, the control unit 17 comprises a drive circuit through which the control signals from the microcomputer are converted into drive signals to each of the electromagnetic solenoid valves $6A_{SOL}$, $6B_{SOL}$, $7A_{SOL}$, $7B_{SOL}$, $8F_{SOL}$, $8RR_{SOL}$, $8FR_{SOL}$, $8RL_{SOL}$, $10FL_{SOL}$, $10RR_{SOL}$, $10FR_{SOL}$, and $1RL_{SOl}$. The microcomputer comprises an input interface circuit having A/D conversion function, an output interface circuit having D/A conversion function, a calculation processing device including a microprocessor unit MPU and a storage device including RAM and ROM. Since a clock speed of the microcomputer of the control unit 17 is very high, the microcomputer is arranged to output a standard rectangular wave control signal indicative of digital data modified by pulse width modulation (PWM). Each drive circuit is arranged to simply convert and amplify the control signal into a drive signal adapted to the operation of each actuator (control valve). The microcomputer of the control unit 17 further outputs a drive control signal of each of the reducing pumps 11A and 11B and a control signal of a switching element of each actuator relay for controlling a power supply to each actuator (control valve).

Next, the calculation process of the brake fluid pressure control executed by the microcomputer of the control unit 17 for the purpose of the control of the yawing motion variable of the vehicle will be discussed with reference to flowcharts of FIGS. 2 and 3. Although a stop for data communication in the microcomputer is not discussed in these flowcharts, the microcomputer of the control unit 17 is arranged to continuously transmit various programs and maps stored in the ROM of the storage device and data stored in the RAM of the storage device to a buffer of the calculation processing device and to properly store the calculation result of the calculation processing device in the storage device.

Figure 2:
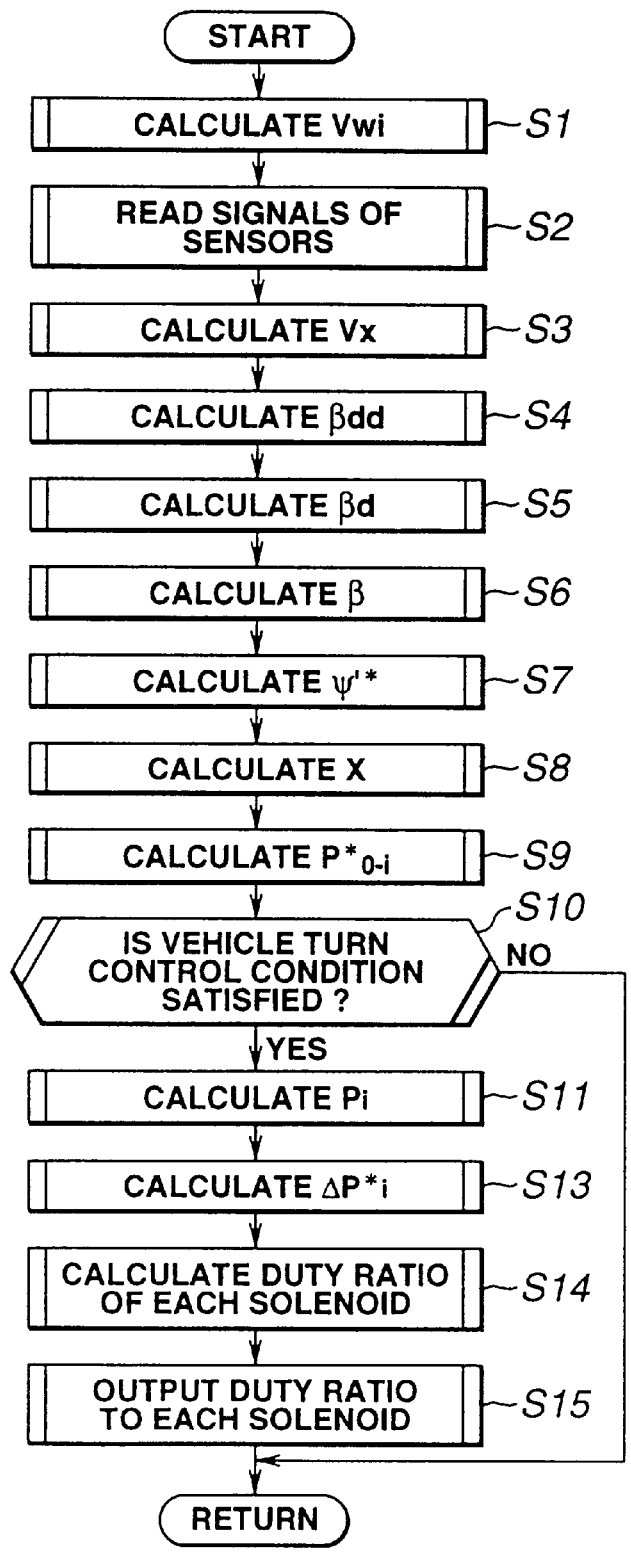
FIG. 2 is a flowchart showing a calculation process executed by a control unit of the vehicle turn control system of FIG. 1.

FIG. 2 shows a main routine of the braking force control of the vehicle turning control system according to the present invention. The calculation process of this routine is executed at 10 msec intervals as a predetermined-time interruption process.

At a step S1, the control unit 17 calculates a wheel speed Vwi (i=FL, PR, RL, RR) of each wheel 1FL, 1FR, 1RL, 1RR on the basis of the sine wave signal of each wheel speed sensor 12FL, 12FR, 1RL, 12RR. More specifically, the sine wave signal from each of the wheel speed sensors 12FL, 12FR, 12RL and 12RR is transformed into a rectangular wave form. Further, the wheel speed Vwi is calculated from a pulse width which is obtained by reading high and low variation of the rectangular at short sampling cycles. That is, the pulse width of the rectangular a wave signal becomes greater according to the decrease of the wheel speed Vwi and becomes smaller according to the increase of the wheel speed Vwi. Since the pulse width of the rectangular wave signal corresponds to a time period that predetermined teeth pass through a sensor, the pulse width and the rotation angle speed of the wheel 1FL, 1FR, 1RL, 1RR have a relationship of inverse proportion. Therefore, the rotation angle speed of each wheel is obtained from the pulse width of the rectangular wave form of each of the wheel speed sensor. By multiplying a tire rotational radius with the rotation angle speed, each of the wheel speed Vwi is obtained. It will be understood that the wheel speed Vwi may be calculated by a conventional method that the wheel rotation angle speed is obtained by counting the number of pulses within a predetermined period.

At a step S2, the control unit 17 reads detection signals from the sensors 13 to 16.

At a step S3, the control unit 17 calculates an estimated vehicle speed Vx by executing a predetermined calculation process. This calculation process is arranged to calculate the estimated vehicle body speed Vx without using a forward acceleration. The process of calculating the estimated vehicle body Vx is shown, for example, in Japanese Patent Provisional Publication No. 8-150920, the disclosure of which is hereby incorporated by reference. In this embodiment, since the acceleration sensor 15 detects the forward acceleration of the vehicle, the detection signal indicative of the forward acceleration will be s employed to obtain the estimated vehicle body speed or to support this method.

At a step S4, the control unit 17 calculates a sideslip acceleration Pdd from the lateral acceleration $Y_G$ obtained by the acceleration sensor 15, the estimated vehicle body speed Vx, the actual yaw rate $\psi'$ obtained by the yaw rate sensor 13 and the following equation (1);

$$\beta dd = Y_G - Vx \cdot \psi' \tag{1}$$

At a step S5, the control unit 17 calculates a sideslip speed βd by integrating the sideslip acceleration βdd in time. This calculation process employs a low-pass filter treatment whose phase has been properly set.

At a step S6, the control unit 17 calculates a sideslip angle β of the vehicle from a ratio βdd/Vx of the sideslip speed βd and the estimated vehicle body speed Vx.

At a step S7, the control unit 17 calculates a target yaw rate $\psi'^*$ by means of a calculation process employing a vehicle model shown in a Japanese Patent Provisional Publication No. 5-24528 proposed by the applicant of the present invention. The target yaw rate $\psi'^*$ is a yaw rate which is achieved when the vehicle is turning under a neutral steer state as a result that a preset cornering force is obtained at each wheel. In the calculation process of the target yaw rate $\psi'^*$, the steer angle θ of the wheel 1FL, 1FR, 1RL, 1RR may be obtained by dividing the angular movement of the steering wheel by a steering gear ratio or may be obtained from a map showing a relationship between the estimated vehicle body speed Vx and the steer angle θ. Zn any case, a vehicle model based on the vehicle dynamic equation is employed as a basic model. A detailed explanation of a method for deriving a vehicle model is shown in a book "VEHICLE DYNAMICS AND CONTROL" written by Masato Abe and published 1990 by Kabushiki Gaisha Sankaido in Japan.

At a step S8, the control unit 17 calculates a vehicle turn state value X from the target yaw rate difference (deviation) $\Delta\psi'^*$ which is a difference between the target yaw rate $\psi'^*$ and the actual yaw rate $\psi'$. The vehiale turn state value X is adapted to evaluate the vehicle turn such as an excessive understeer state in that the actual yaw rate is very greater than the target yaw rate and the sideslip angle β and the sideslip speed βd are small or an excessive oversteer in that the target yaw rate is very greater than the actual yaw rate and the sideslip angle β and the sideslip speed βd are large.

At a step S9, the control unit 17 calculates each target wheel cylinder pressure $P^*_{0-i}$ of the wheel cylinder 2FL, 2FR, 2RL, 2RR of each of the wheels 1FL to 1RR according to the vehicle turn state value X. The target wheel cylinder pressure $P^*_{0-i}$ is employed to generate a braking force difference between the front-rear and right-left wheels so as to adjust the actual yaw rate $\psi'$ at the target yaw rate $\psi'^*$ or to adjust the sideslip angle β and the sideslip speed βd at predetermined target values. More specifically, the braking force difference is derived from a linear sum of a control gain and one of the target yaw rate difference $\Delta P^*_{0-i}$ the sideslip angle difference and the sideslip speed difference, and each of the wheel cylinder pressure $P_i$ is obtained by converting the braking force difference to a brake fluid pressure difference.

At a step S10, the control unit 17 decides whether a vehicle turn control condition is satisfied or not. When the decision at the step S10 is affirmative, the routine proceeds to a step S11.

When the decision at the step S10 is negative, the routine returns to a main program. In this processing of the step S10, the vehicle turn control condition includes a condition that the target yaw rate difference $\Delta\psi'^*$ is greater than a preset value and a condition that the sideslip angle $\beta$ and the sideslip speed $\beta d$ are very greater than or very smaller than the target values. In case that the vehicle turn control is started and that the target wheel cylinder pressure $P_i$ is set at 0, the control unit 17 outputs a pre-charge control command for improving the responsibility of the brake mechanism by decreasing each clearance between the pad and disc of the brake mechanism. A pre-charge control is started in reply to the pre-charge control command. More specifically, the control unit 17 executes the pre-charge control so as to put each wheel cylinder into a pre-charged state wherein a small amount of brake fluid, which does not generate braking force, is applied to the wheel cylinder to improve the responsibility of the brake fluid pressure control.

At a step S11, the control unit 17 calculates each of estimated wheel cylinder pressures $P_i$. More specifically, since the wheel cylinder pressure control for the vehicle turn control has already started, the microcomputer of the control unit 17 has already known the control variable, namely the wheel cylinder varied pressure variable. Therefore, the master cylinder pressure at the start of the vehicle turn control is set as an initial value, and the estimated wheel cylinder pressure $P_i$ is obtained by accumulating the wheel cylinder varied pressure variable in the previous control period and the initial value.

Figure 3:
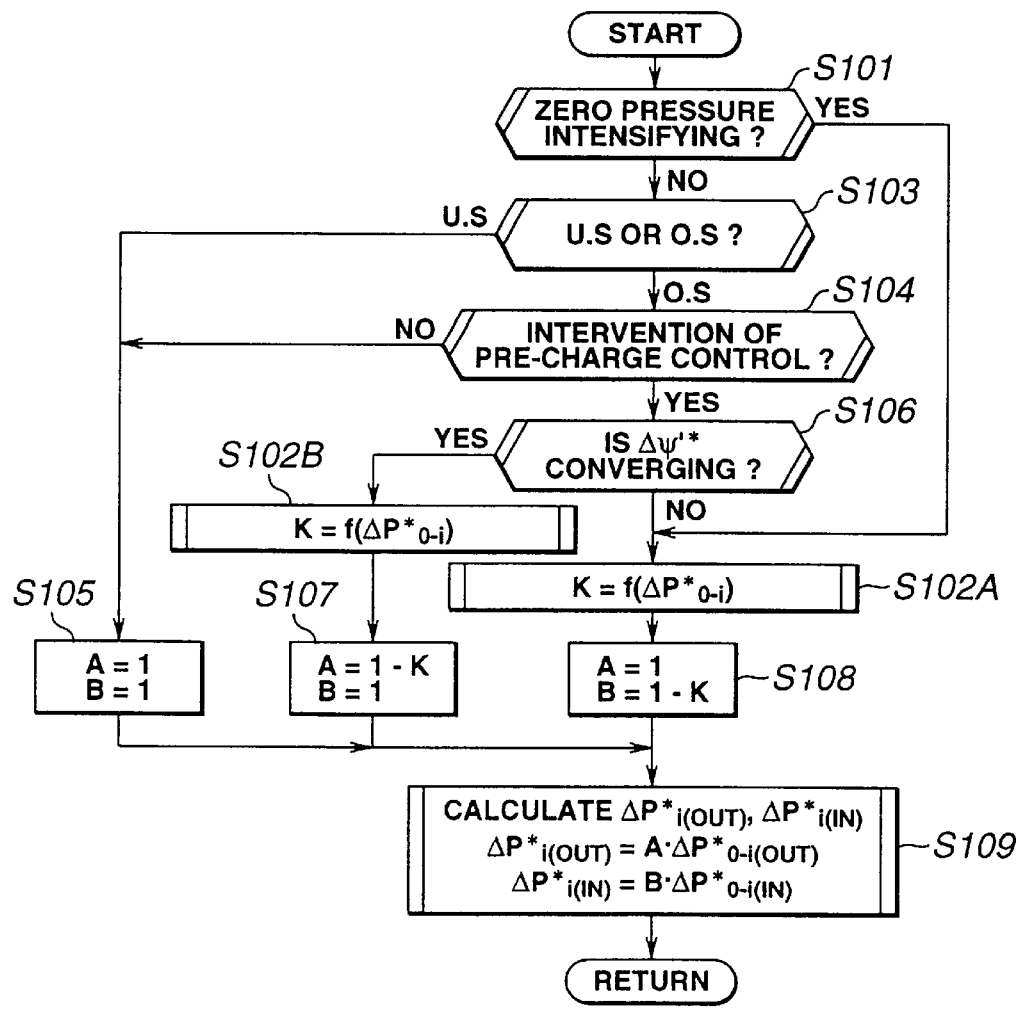
FIG. 3 is a flowchart showing a miner calculation process executed by the control unit.

At a step S13, the control unit 17 calculates an achievement wheel cylinder varied pressure is quantity $\Delta P^*_i$ on the basis of the target wheel cylinder pressure $P^*_{0-i}$ and a calculation process shown by a flowchart of FIG. 3.

At a step S14, the control unit 17 calculates each solenoid exciting drive pulse duty ratio of each of the intensifying pressure control valves 8FL to 8RR and the reducing control valves 10FL to 10RR by each wheel. More specifically, to open and close the intensifying pressure control valves 8FL to 8RR and the reducing control valves 10FL to 10RR by each wheel, the control unit 17 calculates each solenoid exciting drive pulse duty ratio which functions to determine ON time ratio of each of the solenoid valves $8FL_{SOL}$, to $8RR_{SOL}$ and $10FL_{SOL}$ to $10RR_{SOL}$. That is, to obtain achievement wheel cylinder varied pressure quantity $\Delta P^*i$ at the present control period, the time ratio for controlling the ratio of opened time of each of the intensifying valves 8FL to 8RR and the reducing valves 10FL to 10RR is calculated as a duty ratio of the drive pulse by each wheel.

At a step S15, the control unit 17 outputs a solenoid exciting drive pulse control signal corresponding to the duty ratio obtained at the step S14 by each of the solenoid valves $SF_{SOL}$ to $8RR_{SOL}$ and $10FL_{SOL}$ to $10RR_{SOL}$. The method for generating the drive pulse signal corresponding to the duty ratio executed at the stop S15 is generally similar to a conventional PWM (Pulse Width Modulation) control, and therefore the explanation thereof is omitted herein.

Next, the calculation process of the flowchart of FIG. 3 executed at the step S13 of the calculation process of FIG. 2 will be discussed. The calculation process of FIG. 3 is for the front two wheels 1FL and 1FR which axe put In the turning state after the vehicle turn control was started. The calculation process for the rear wheels 1RL and 1RR is the same as that of the front wheels 1FL and 1FR. Although the explanation as to the calculation process of the rear wheels 1RL and 1RR is omitted herein, the calculation process of the rear wheels 1RL and 1RR is executed by the control unit 17 as same as the calculation process of the front wheels 1FL and 1FR.

At a step S101, the control unit 17 decides whether the two wheel cylinders 2FL and 2RR or the two wheel cylinders 2FR and 2RL are put in a condition requiring the pressure intensifying from zero pressure or not, on the basis of the estimated wheel cylinder pressure $P_i$. When the decision at the step S101 is affirmative, the routine jumps to a step S102. When the decision at the step S101 Is negative, the routine proceeds to a step S103.

At the step S103, the control unit 17 decides whether the vehicle is put in the understeer state (U.S) or the oversteer state (O.S), on the basis of the vehicle turn state value X including the target yaw rate difference $\Delta\psi'^*$, the sideslip angle difference, or the sideslip speed difference. When it is decided at the step S103 that the vehicle is put in the oversteer state, the routine proceeds to a step S104. When it is decided at the steep S103 that the vehicle is put in the understeer state, the routine proceeds to a step S105.

At the step S104, the control unit 17 decides whether or not the pre-charge control is being executed, on the basis of the execution of the step in the flowchart of FIG. 2. In other words, the control unit 17 decides whether or not the intervention of the pre-charge control exists. When the decision at the step S104 is affirmative, the routine proceeds to a step S106. When the decision at the step S104 is negative, the routine proceeds to the step S105. The method of intervention fo the pre-charge control is shown, for example, in Japanese Patent Application No. 10-29819 filed on Feb. 12, 1998, the disclosure of which is hereby incorporated by reference.

At the step S106, the control unit 17 decides whether the target yaw rate difference $\Delta\psi'^*$ is converging or not. More specifically, the control unit 17 decides whether or not the absolute value of the target yaw rate difference $\Delta\psi'^*$ at present time is smaller than that of the target yaw rate difference $\Delta\psi'^*$ detected at the previous routine. When the control unit 17 decides that the target yaw rate difference $\Delta\psi'^*$ is converging, the routine proceeds to a step S102B. When the decision at the step S106 is negative, the routine proceeds to a S step S102A.

Figure 4:
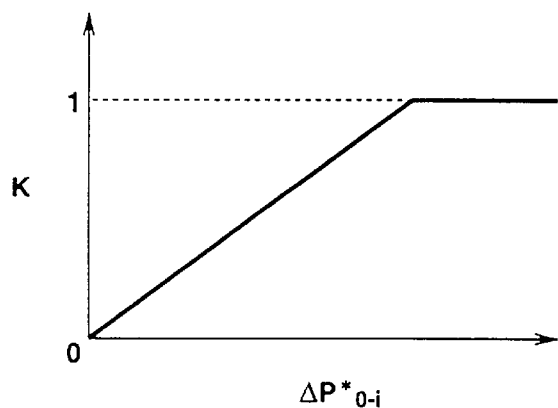
FIG. 4 is a graph showing a control map employed in the calculation process of FIG. 3.

At the step S102A following to the negative decision at the step S106 or the affirmative decision at the step S101, the control unit 17 obtains an intensifying achievement coefficient K for a turn outer-wheel from a control map of FIG. 4 and the target wheel cylinder pressure $P^*_{0-i}$. The intensifying achievement coefficient K is obtained according to the turn outer-wheel wheel-cylinder pressure difference $\Delta P^*_{0-i}$ which is obtained by subtracting the turn outer-wheel estimated wheel cylinder pressure $P_{i(out)}$ from the turn outer-wheel target wheel cylinder pressure $P^*_{0-i(out)}$. Hereinafter, a reference (IN) denotes a turn outer-wheel, and a reference (OUT) denotes a turn outer-wheel. Therefore, when the turn outer-wheel wheel cylinder pressure difference $\Delta P^*_{0-1(IN)}$ is 0, the intensifying achievement coefficient K is also 0. The intensifying achievement coefficient K linearly increases according to the increase of the turn inner-wheel-wheel cylinder pressure difference $\Delta P^*_{0-i(IN)}$. Thereafter, when the intensifying achievement coefficient K reaches 1, it is kept at 1, as is clearly shown in FIG. 4.

At a step S108 following to the execution of the step S102A, the control unit 17 sets a turn outer-wheel gain A at 1 and a turn inner-wheel gain B at a value obtained by subtracting the intensifying achievement coefficient K from 1 (A=1, B=1−K).

At the step S102B following to the affirmative decision at the step S106, the control unit 17 obtains the intensifying achievement coefficient K for the turn outer wheel from the control map of FIG. 4 and the target wheel cylinder pressure $P^*_{0-i}$ as same as that obtained at the step S102A.

At the step S107 following to the execution of the step S102B, the control unit 17 sets the turn outer-wheel gain A at 1−K and a turn inner-wheel gain B at 1 (A=i−K, B=i).

At the step S105 following to the recognition of the understeer state at the step S103 or the negative decision at the step S104, the control unit 17 sets the turn outer-wheel gain A at 1 and the turn inner-wheel gain B at 1 (A−1, B=1).

Following to the execution of each of the steps S105, S107 and S108, the routine proceeds to a steep S109 wherein the control unit 17 calculates the turn outer-wheel achievement wheel cylinder varied pressure quantity $\Delta P^*_{i(OUT)}$ from the equation (2) and the turn inner-wheel achievement wheel cylinder varied pressure quantity $\Delta P^*_{i(IN)}$ from the equation (3).

$$\Delta P^*_{i(OUT)} = A^* \Delta P^*_{0\text{-}i(OUT)} \quad (2)$$

$$\Delta P^*_{i(IN)} = B^* \Delta P^*_{0\text{-}i(IN)} \quad (3)$$

When the turn inner-wheel wheel-cylinder pressure difference $\Delta P^*_{0\text{-}i(IN)}$ is a pro-charge pressure applied by the pre-charge control interruption and when the turn inner-wheel gain B is smaller than 1, the turn inner-wheel achievement wheel cylinder varied pressure quantity $\Delta P^*_{i(IN)}$ is set at 0.

Next, the manner of operation of the vehicle turn control system according to the embodiment of the present invention will be discussed. First, the scheme of the vehicle turn control system of the embodiment will be discussed.

Figure 5A:
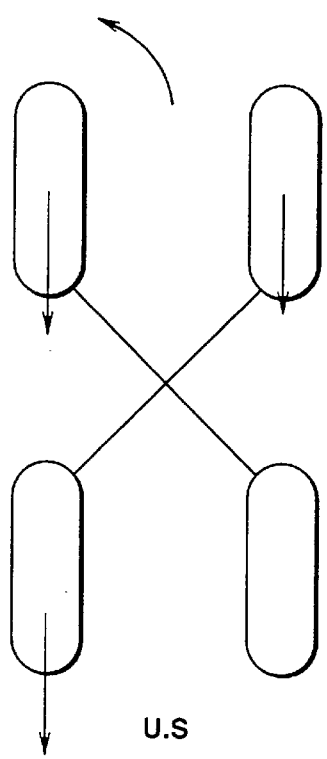
FIGS. 5A to 5D are schematic views for explaining the operation of the flowchart of FIG. 2.

The target yaw rate $\psi'^*$ calculated at the step S7 of FIG. 2 is a yaw rate generated when the vehicle achieves a neutral steer within a tire gripping range. Therefore, when the absolute value of the actual yaw rate $\psi'$ is smaller than the absolute value of the target yaw rate $\psi'^*$, the vehicle is put in the understeer state. When the absolute value of the actual yaw rate $\psi'$ is greater than the absolute value of the target yaw rate $\psi'^*$, the vehicle is put in the oversteer state. Therefore, the target wheel cylinder pressure $P^*_{0\text{-}i}$ calculated at the step S9 of the flowchart of FIG. 2 functions such that the understeer state shown in FIG. 5A is improved by applying no braking force to the turn outer rear wheel, applying the largest braking force to the turn inner rear wheel, and applying braking force to the front wheels such that the braking force of the turn inner front wheel is greater than the braking force of the turn outer front wheel. This braking operation based on the target wheel cylinder pressure $P^*_{0\text{-}i}$ functions to apply a spin moment directed in the oversteer direction so as to correct the understeer state of FIG. 5A. Further, in case of the oversteer state shown in FIG. 5B, no braking force is applied to the turn inner front and rear wheels, the largest braking force is applied to the turn outer front wheel, and a small braking force is applied to the turn outer rear wheel. This operation functions to apply a spin moment directed in the understeer direction so as to correct the oversteer state of FIG. 5B.

Figure 5B:
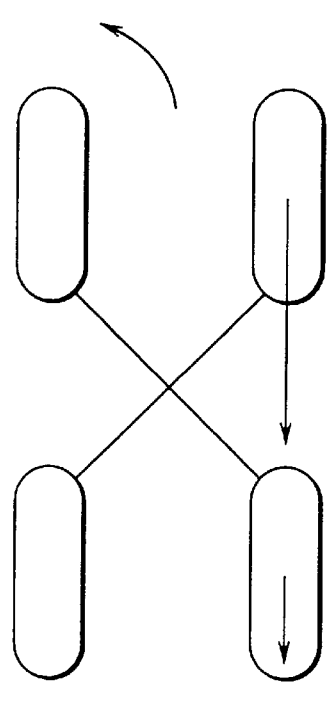
Figure 5C:
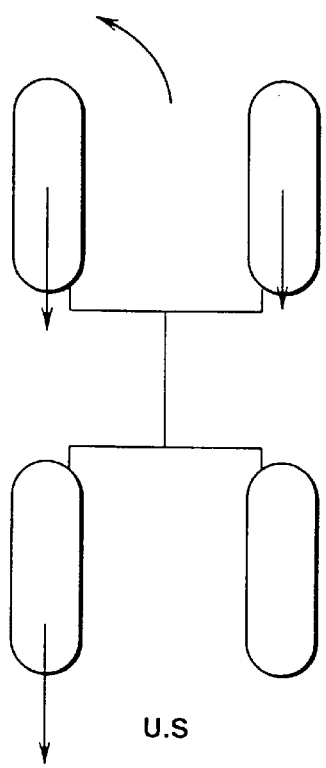
Figure 5D:
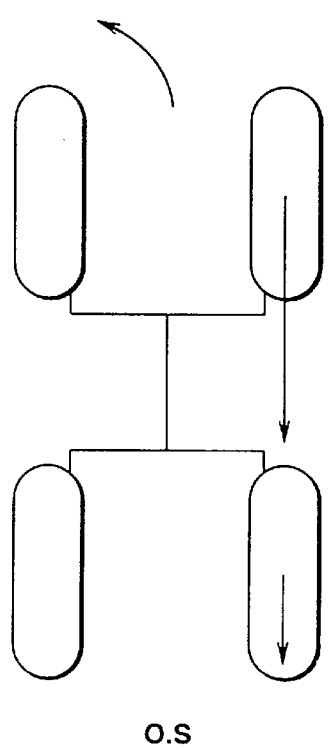

Although a brake structure employed in the embodiment of the present invention is a diagonal split brake structure as shown in FIGS. 5A and 5B, it will be understood that this control according to the present invention may be applied to a vertical split brake structure. That is, the control strategy employed In the diagonal split brake structure may be similarly applied to the vertical split brake structure as shown in FIGS. 5C and 5D.

Accordingly, when the target wheel cylinder pressure is achieved while feedbacking the yaw rate, the extremely large oversteer or understeer is is corrected to ensure the neutral-steer within the tire gripping range.

FIGS. 7A and 78 show a simulation result of the set duty ratio of the varied pressure control of the required wheel cylinder pressure and the calculated present estimated wheel cylinder pressure.

In case that the two wheel cylinders 2FL and 2RR or 2FR and 2RL are connected to one brake fluid pressure source and that the brake fluid pressure produces the difference for executing the brake control as mentioned above, if it is intended to simultaneously intensify the two wheel cylinder pressure, the intensified gradient of the high pressure side thereof becomes small and the intensified gradient of the low pressure side thereof becomes larger due to the saturation of the fluid pressure. Accordingly, even if the open time control of the intensifying valve is executed regardless the wheel cylinder pressure, it is difficult to ensure a desired brake fluid pressure at the high pressure side, Although this limitation is solved by recognizing the wheel cylinder pressure and correcting the open time according to the intensified gradient, it is difficult to increase the intensified gradient of the high pressure side wheel cylinder.

Figure 6A:
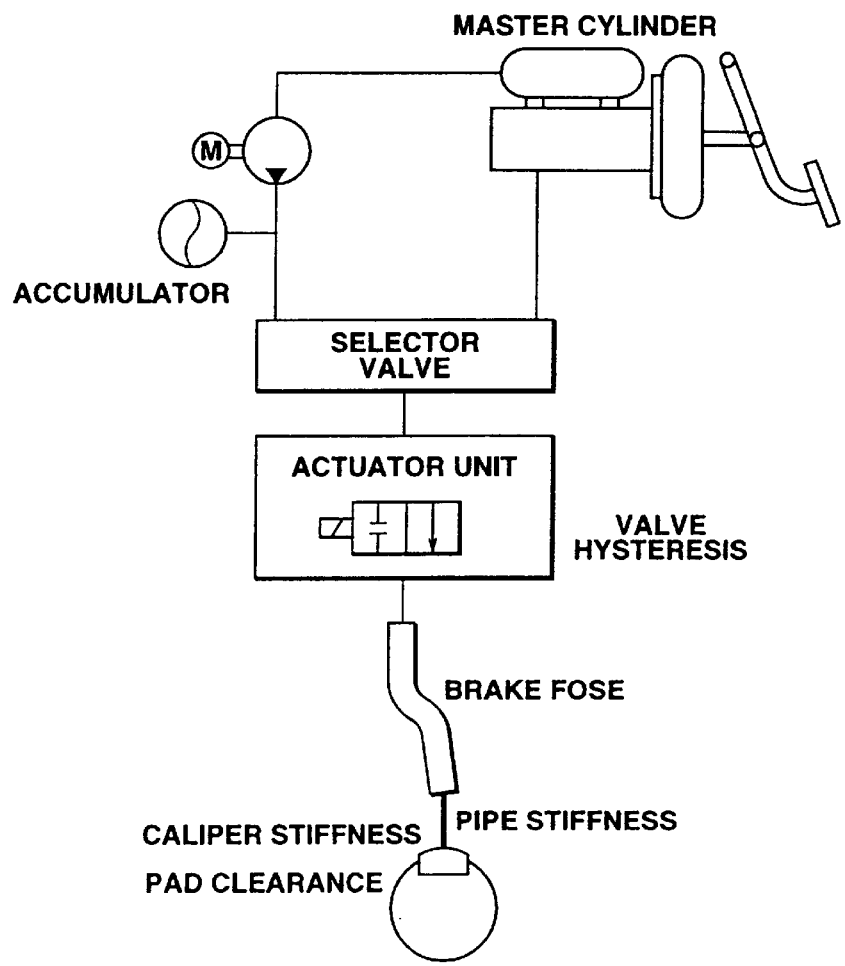
FIG. 6A is a schematic view for explaining a dead zone of brake fluid pressure.
Figure 6B:
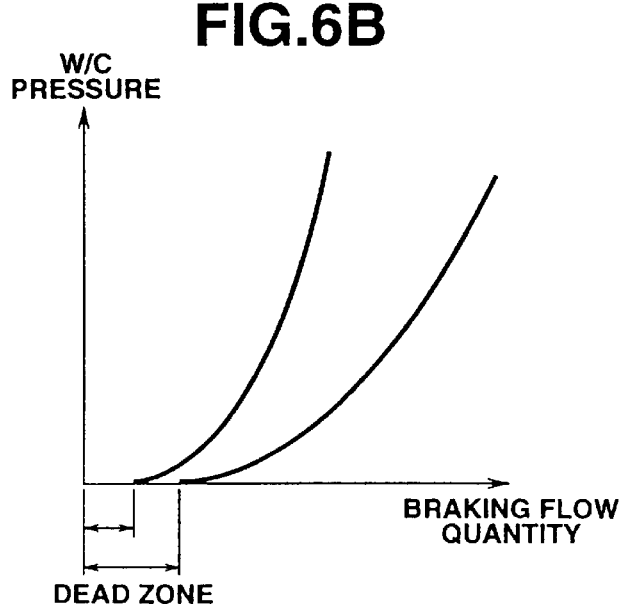
FIG. 6B is a graph for explaining the dead zone of FIG. 6A.

FIG. 6A shows a skeleton view showing a one-wheel model of the fluid pressure control system of FIG. 1. As shown in FIG. 6A, it is necessary to install an accumulator at o discharge side of the intensifying pump 3. Further, there is valve hysteresis as to each of a selector valve including the master cylinder ON/OFF valve and the intensifying pump ON/OFF valve and the intensifying control valves in the actuator unit. Furthermore, the fluid pressure control system includes a mechanical deformation factors mainly in pipes such as flexible hoses, pipe rigidity, caliper rigidity. Additionally, there is a pad clearance between a brake pad and a disc rotor. Therefore, a response hysteresis including a dead zone is generated between a supply amount of the brake fluid and the wheel cylinder (W/C pressure) as shown in FIG. 6B. Furthermore, this phenomenon depends on temperature. As a result, it is clear that there is a non-intensified zone in that the wheel cylinder pressure is not increased by the increase of the brake fluid amount.

Therefore, at the wheel cylinder requiring the zero pressure Intensifying, the brake fluid is consumed to clear the dead zone. This lowers the responsibility of the braking pressure control. If the brake control system executes to previously estimate the wheel whose wheel cylinder pressure should be intensified, and to supply a amount of the brake fluid for canceling the dead zone to the wheel cylinder to be intensified, it becomes difficult to intensify the pressure of the high pressure side wheel cylinder. This phenomenon is also generated in the pressure pre-charge control. In the vehicle turn control, the excessive oversteer state is first ought to be avoided. In order to avoid the excessive oversteer, it is necessary to apply a large braking force to the turn outer wheel, that is, to apply a large wheel cylinder pressure. Further. when the actual yaw rate $\psi'$ generated at the vehicle is increasing under the oversteer state, that is, when the absolute value of the target yaw rate difference $\Delta \psi'$ is not converging, the vehicle turn control system will function to further increase the wheel cylinder pressure of the turn outer wheal to ensure further large anti-spin moment by the execution of the step S9 of the flowchart in FIG. 2.

Therefore, the embodiment of the present invention is arranged such that at the steps S101 or S103, S104 and S106 of the calculation process of FIG. 3, the control unit 17 decides whether there is a further pressure intensifying requirement of the high pressure side wheel cylinder pressure or a factor for decreasing the intensifying gradient. When it is decided that there is such a factor, the routine proceeds to the step S102A or S102B wherein the intensifying achievement coefficient K is set. The coefficient K is set at a larger value when the turn outer wheel cylinder pressure difference $\Delta P^*_{0\text{-}i(out)}$ of the high pressure side becomes larger under the oversteer state. That is, when the target wheel cylinder pressure $P^*_{0\text{-}i(out)}$ is set a value greater than the estimated wheel cylinder pressure $P_{i(out)}$ of the turn inner wheel, the intensifying achievement coefficient K is set at a large value. Therefore, at the step S108 following to the step S102A, the turn inner wheel gain 13 is set at a value smaller than the turn outer wheel gain A set at 1. In an excessive case, the turn inner wheel gain B is set at 0. Accordingly, at the stop S109 following to the execution of the step S108, the achievement wheel cylinder varied pressure quantity $\Delta P^*_{i(OUT)}$ of the turn outer wheel is set at the target wheel cylinder varied pressure quantity $\Delta P^*_{0\text{-}i(OUT)}$ of the turn outer wheel, and the achievement wheel cylinder varied pressure quantity $\Delta P^*_{i(IN)}$ of the turn inner wheel is set at a value which is very smaller than the target wheel cylinder varied pressure quantity $\Delta P^*_{O\text{-}i(IN)}$ of the turn inner wheel. In case of the pre-pressure control, the achievement wheel cylinder varied pressure quantity $\Delta P^*_{i(IN)}$ of the turn inner wheel is set at 0.

By controlling the wheel cylinder pressures of the turn inner and outer wheels according to the achievement wheel cylinder varied pressure quantity $\Delta P^*_i$, it becomes possible to ensure the responsibility of the control. More specifically, by employing the achievement wheel cylinder varied pressure quantity $\Delta P^*_i$, even if the intensifying requirement of the wheel cylinder pressure is outputted to both of the turn inner and outer wheels, the turn inner wheel of the low pressure side is almost not or completely not intensified, and the wheel cylinder intensified gradient of the turn outer wheel of the high pressure side is ensured. This ensures the responsibility of the brake control.

Further, with the thus arranged control, when the vehicle is put in the understeer state in that a large pressure difference is generated between the outer and inner wheels, the low pressure side wheel cylinder is gradually increased so as to prevent a large amount of brake fluid from flowing into the low pressure side wheel cylinder. This solves the problem that the broke fluid is flown out from the high pressure side wheel cylinder and thereby lowering the high pressure side wheel cylinder pressure.

On the other hand, when the actual yaw rate $\psi'$ is converging to the target yaw rate $\psi'^*$ under the oversteer state, that is, when the target yaw rate difference $\Delta\psi'^*$ is converging, the oversteer state is being improved. Therefore, it is necessary to be careful with respect to the transient from the oversteer state to the understeer state. If the vehicle is put in the understeer state from the oversteer state, It is necessary to increase the turn inner-wheel wheel cylinder pressure. Therefore, this embodiment of the present invention is arranged such that when it is decided that the target yaw rate is converging, the routine of the calculation process of FIG. 3 proceeds from the step S106 to the step S107 wherein the turn outer wheel gain A is set at 1–K and the turn inner wheel gain B is set at 1. Therefore, the achievement wheel cylinder varied pressure quantity $\Delta P_{i(OUT)}$ of the turn outer wheel is set at 1–K time the target wheel cylinder varied pressure quantity $\Delta P^*_{O\text{-}i(OUT)}$, and the achievement wheel cylinder varied pressure quantity $\Delta P^*_{i(IN)}$ Of the turn inner wheel is set at the target wheel cylinder varied pressure quantity $\Delta P^*_{O\text{-}i(OUT)}$. That is, by executing the control of the wheel cylinder pressures of the inner and outer wheels according to the achievement wheel cylinder varied quantity $\Delta P^*_i$, the outer-wheel wheel cylinder pressure is not increased, and the wheel cylinder intensifying gradient of the turn inner wheel is relatively ensured. Therefore, the responsibility to an understeer state, which will generate next, is ensured.

Further, when the vehicle is put in the understeer state or pre-charge control inoperative state in that it is not necessary to intensify the pressure from zero, the routine proceeds from the step S103 or S104 to the step S105 wherein both of the turn outer wheel gain A and the turn inner wheel gain B are set at 1. Therefore, the achievement wheel cylinder varied pressure quantity $\Delta P^*_i$ is set at the target wheel cylinder varied pressure quantity $\Delta P^*_{O\text{-}i}$ to set the vehicle turn Into a neutral steer. Therefore, the normal vehicle turn control is executed.

The steer angle sensor shown in FIG. 1 constitutes steer angle detecting means. The wheel speed sensors 12FL to 12RR shown in FIG. 1 constitute wheel speed detecting means. The acceleration sensor 15 shown in FIG. 1 constitutes acceleration detecting means. The yaw rate sensor shown in FIG. 1 constitutes yaw rat detecting means. The step S11 of the calculation process of FIG. 2 and the step S101 or S104 of the calculation process of FIG. 3 constitute brake fluid pressure condition detecting means. The steps S102, S105, S107 and S108 of the calculation process of FIG. 3 constitute gain setting means. The step S101 of the calculation process of FIG. 3 constitutes zero pressure intensifying detecting means. The step S101 of the calculation process of FIG. 3 constitutes zero pressure intensifying detecting means. The step S101 of the calculation process of FIG. 3 constitutes zero pressure intensifying detecting means. The step S102 of the calculation process of FIG. 3 constitutes intensifying is achievement coefficient calculating means. The step S104 of the calculation process of FIG. 3 constitutes pre-pressure control detecting means.

The steps S7 and S8 of the calculation process of FIG. 2 and the step S103 or S106 of the calculation process of FIG. 3 constitute vehicle turn detecting means. The step S103 of the calculation process of FIG. 3 constitutes oversteer detecting means. The step S106 of the calculation process of FIG. 3 constitutes yaw rate convergence detecting means.

Although the embodiment of the present invention has been shown and described so that the control unit 17 comprises a microcomputer, it will be understood that an electronic circuit constituted by counters, comparators and so on may be employed instead of the microcomputer.

While the embodiment of the present invention has been shown and described so as to employ the yaw rate as a parameter representative of a controlled vehicle turn, it will be understood that the other parameters representative of the vehicle turn such as lateral acceleration or sideslip angle may be employed. That is, the vehicle turn control according to the present invention may be arranged such that a control based on a difference between a detected lateral acceleration and a target lateral acceleration or based on a difference between a detected sideslip angle and a target sideslip angle is executed.

The entire contents of Japanese Patent Application No. 10-91486 filed on Apr. 3, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. A turn control system for a vehicle, comprising:
   a steer angle sensor sensing a steer angle of a wheel of the vehicle;
   a vehicle speed detector sensing a vehicle speed;
   a vehicle turn variable detecting section detecting a vehicle turn variable indicative of a turn state of the vehicle;
   a brake system applying a brake fluid pressure to two brake lines, respectively one of the two brake lines being connected to one of wheel cylinders for front right and rear right wheels and to wheel cylinders for front left and rear left wheels, the other of the two brake lines being connected to the other of the wheel cylinders for the front right and rear right wheels and to the other of the wheel cylinders for the front left and rear left wheels; and
   a controller arranged
   to calculate a target vehicle turn variable on the basis of the steer angle and the vehicle speed,
   to control said brake system according to a difference between the actual vehicle turn variable and the target vehicle turn variable,
   to apply a pre-charge pressure to the brake lines on the basis of the vehicle turn state before said brake system applies the brake fluid pressure to the brake lines, and to restrict the operation of applying the pre-charge pressure to one of the two brake lines when the other of the two brake lines has been put in a high pressure condition and when the other of the two brake lines put in the high pressure condition is further required to intensify the brake fluid pressure.

2. A turn control system for a vehicle comprising:

steering angle detecting means for detecting information indicative of a steer angle of a wheel and outputting a steer angle signal indicative of the steer angle;

vehicle speed detecting means for detecting information indicative of a vehicle speed and outputting a vehicle speed signal indicative of the vehicle speed;

actual vehicle turn variable detecting means for detecting an actual vehicle turn variable indicative of a turn condition of the vehicle and outputting a vehicle turn signal indicative of the actual vehicle turn variable;

target vehicle turn variable calculating means for calculating a target vehicle turn variable on the basis of the steer angle signal and the vehicle speed signal;

brake pressure controlling means for controlling a brake pressure supplied to two brake lines according to a difference between the actual vehicle turn variable and the target vehicle turn variable, one of the two brake lines being connected to one of wheel cylinders for front right and rear right wheels and to one of wheel cylinders for front left and rear left wheels. the other of the two brake lines being connected to the other of the wheel cylinders for the front right and rear right wheels and to the other of the wheel cylinders for the front left and rear left wheels;

pre-charging means for applying a pre-charge pressure to the brake lines on the basis of the vehicle turn condition before the brake pressure is applied to the brake lines; and pre-charge restricting means for restricting the operation of said pre-charging means to one of the two brake lines when the other of the two brake lines has been put in a high pressure condition and when the other of the two brake lines put in the high pressure condition is further required to intensify the brake pressure.

3. A method for controlling a vehicle turn, comprising:

detecting information indicative of a steer angle of a wheel end outputting a steer angle signal indicative of the steer angle;

detecting information indicative of a vehicle speed and outputting a vehicle speed signal indicative of the vehicle speed;

detecting an actual vehicle turn variable indicative of a turn condition of the vehicle and outputting a vehicle turn signal indicative of the actual vehicle turn variable;

calculating a target vehicle turn variable on the basis of the steer angle signal and the vehicle speed signal;

controlling a brake hydraulic pressure supplied to two brake lines according to a difference between the actual vehicle turn variable and the target vehicle turn variable, one of the two brake lines being connected to one of wheel cylinders for front right and rear right wheels and to one of wheel cylinders for front left and rear left wheels, the other of the two brake lines being connected to the other of the wheel cylinders for the front right and rear right wheels and to the other of the wheel cylinders for the front left and rear left wheels;

applying a pre-charge pressure to a brake cylinder to be next controlled by the operation of controlling brake pressure on the basis of the vehicle turn condition; and restricting the operation of applying the pre-charging pressure to one of the two brake lines when the other of the two brake lines has been put in a high pressure condition and when the other of the two brake lines put in the high pressure condition is further required to intensify the brake pressure.

4. A turn control system as claimed in claim 1, wherein said controller prohibits the pre-charge control of a turn inner wheel when the actual vehicle turn variable indicates that a degree of an oversteer of the vehicle is increasing.

5. A turn control system as claimed in claim 1, wherein said controller decides that the vehicle is put in an understeer state when an absolute value of the actual vehicle turn variable is smaller than the absolute value of the target vehicle turn variable, and decides that the vehicle is put in an oversteer state when the absolute value of the actual vehicle turn variable is greater than the absolute value of the target vehicle turn variable.

6. A turn control system as claimed in claim 1, wherein when the control unit decides that the vehicle is put in an understeer state, no braking force is applied to a turn-outer rear wheel, a largest braking force is applied to a turn-inner rear wheel, and braking forces are applied to front wheels, respectively, such that the braking force to the turn-inner front wheel is greater than the braking force to the turn-outer front wheel.

7. A turn control system as claimed in claim 1, wherein when the control unit decides that the vehicle is put in an oversteer state, no braking force is applied to the turn-inner wheels, a largest braking force is applied to a turn-outer front wheel, and a small braking force is applied to the turn-outer rear wheel.

8. A turn control system as claimed in claim 1, wherein the target turn variable calculated by said controller is a target yaw rate which is a yaw rate generated when the vehicle achieves a neutral steer within a tire gripping range.

9. A turn control system as claimed in claim 1, wherein the pre-charge pressure is to apply a small amount of brake fluid, which does not generate braking force, to the brake cylinder so as to improve the responsibility of the brake fluid pressure control.

10. A turn control system as claimed in claim 1, wherein said vehicle turn variable detecting section includes a yaw rate sensor.

11. A turn control system as claimed in claim 1, wherein said vehicle turn variable detecting section includes at least one of a yaw rate sensor, an acceleration sensor and a sideslip angle detecting section.

12. A turn control system as claimed in claim 1, wherein when the vehicle is put in an understeer state in that a large pressure difference is generated between the outer and inner wheals, said controller controls the brake system so as to gradually increase the low pressure side brake cylinder to prevent a large amount of brake fluid from flowing into the low pressure side brake cylinder.

13. A turn control system as claimed in claim 1, wherein when the controller decides that the target yaw rate is converging, said controller controls said brake system such that the outer-wheel wheel cylinder pressure is not increased.

14. A turn control system as claimed in claim 1, wherein when the vehicle is put in an understeer state or pre-charge control inoperative state, said controller controls said brake system by a normal vehicle turn control.

* * * * *